(12) United States Patent
Bhaskaran et al.

(10) Patent No.: US 12,422,532 B1
(45) Date of Patent: Sep. 23, 2025

(54) SENSOR CALIBRATION

(71) Applicant: Zoox, Inc., Foster City, CA (US)

(72) Inventors: Sreevatsan Bhaskaran, Redwood City, CA (US); Mathew Piotrowicz, Foster City, CA (US)

(73) Assignee: Zoox, Inc., Foster City, CA (US)

( * ) Notice: Subject to any disclaimer, the term of this patent is extended or adjusted under 35 U.S.C. 154(b) by 0 days.

(21) Appl. No.: 17/531,615

(22) Filed: Nov. 19, 2021

(51) Int. Cl.
*G01S 7/497* (2006.01)
*G01S 17/931* (2020.01)

(52) U.S. Cl.
CPC ............ *G01S 7/497* (2013.01); *G01S 17/931* (2020.01)

(58) Field of Classification Search
None
See application file for complete search history.

(56) References Cited

U.S. PATENT DOCUMENTS

| | | | | |
|---|---|---|---|---|
| 2015/0317535 | A1* | 11/2015 | Lenor | G01N 21/538 382/104 |
| 2018/0113200 | A1* | 4/2018 | Steinberg | B60Q 1/26 |
| 2018/0329066 | A1* | 11/2018 | Pacala | G06T 7/50 |
| 2019/0035099 | A1* | 1/2019 | Ebrahimi Afrouzi | G06T 17/05 |
| 2019/0049242 | A1* | 2/2019 | Adams | G01B 21/16 |
| 2019/0056483 | A1* | 2/2019 | Bradley | G01S 7/4815 |
| 2019/0293772 | A1* | 9/2019 | Pfeiffer | G01S 17/42 |
| 2020/0353878 | A1* | 11/2020 | Briggs | G01C 21/20 |
| 2020/0357143 | A1* | 11/2020 | Chiu | G06F 18/253 |
| 2021/0004610 | A1* | 1/2021 | Huang | G01S 7/497 |
| 2021/0224613 | A1* | 7/2021 | Guo | G06V 10/40 |
| 2021/0255329 | A1* | 8/2021 | Li | G01S 17/10 |
| 2022/0075057 | A1* | 3/2022 | Jones, II | G01S 17/86 |
| 2022/0327737 | A1* | 10/2022 | Wilhelm | G06V 20/64 |
| 2023/0120203 | A1* | 4/2023 | Mimoun | G01S 7/497 356/4.01 |

\* cited by examiner

*Primary Examiner* — Shelby A Turner
*Assistant Examiner* — Brandon J Becker
(74) *Attorney, Agent, or Firm* — Lee & Hayes, P.C.

(57) ABSTRACT

Techniques for determining a calibration score associated with a sensor are discussed herein. For example, a lidar sensor may capture lidar data representing lidar returns in an environment. A number of data points associated with multiple regions can be determined based on one or more lidar scans associated with the sensor. For example, a number of lidar returns for each region may be used to determine a calibration score of the lidar sensor indicating an accuracy of the lidar sensor in a variety of conditions.

20 Claims, 7 Drawing Sheets

SENSOR CALIBRATION

BACKGROUND

A vehicle can use sensors to capture sensor data to detect objects in an environment. Accurate determinations of object characteristics can assist, for example, a vehicle to traverse the environment. However, the quality of the data collected by sensors may become degraded in certain circumstances, including based on environmental factors such as weather, traffic, or road conditions, as well as based on internal errors or malfunctions that may occur within the sensors themselves. In such cases, the data collected by the vehicle sensors may be suboptimal or even unsuitable for use, potentially impacting vehicle navigation, obstacle detection and avoidance, and other vehicle functions that rely on the sensor data.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features.

DETAILED DESCRIPTION

Figure 1:
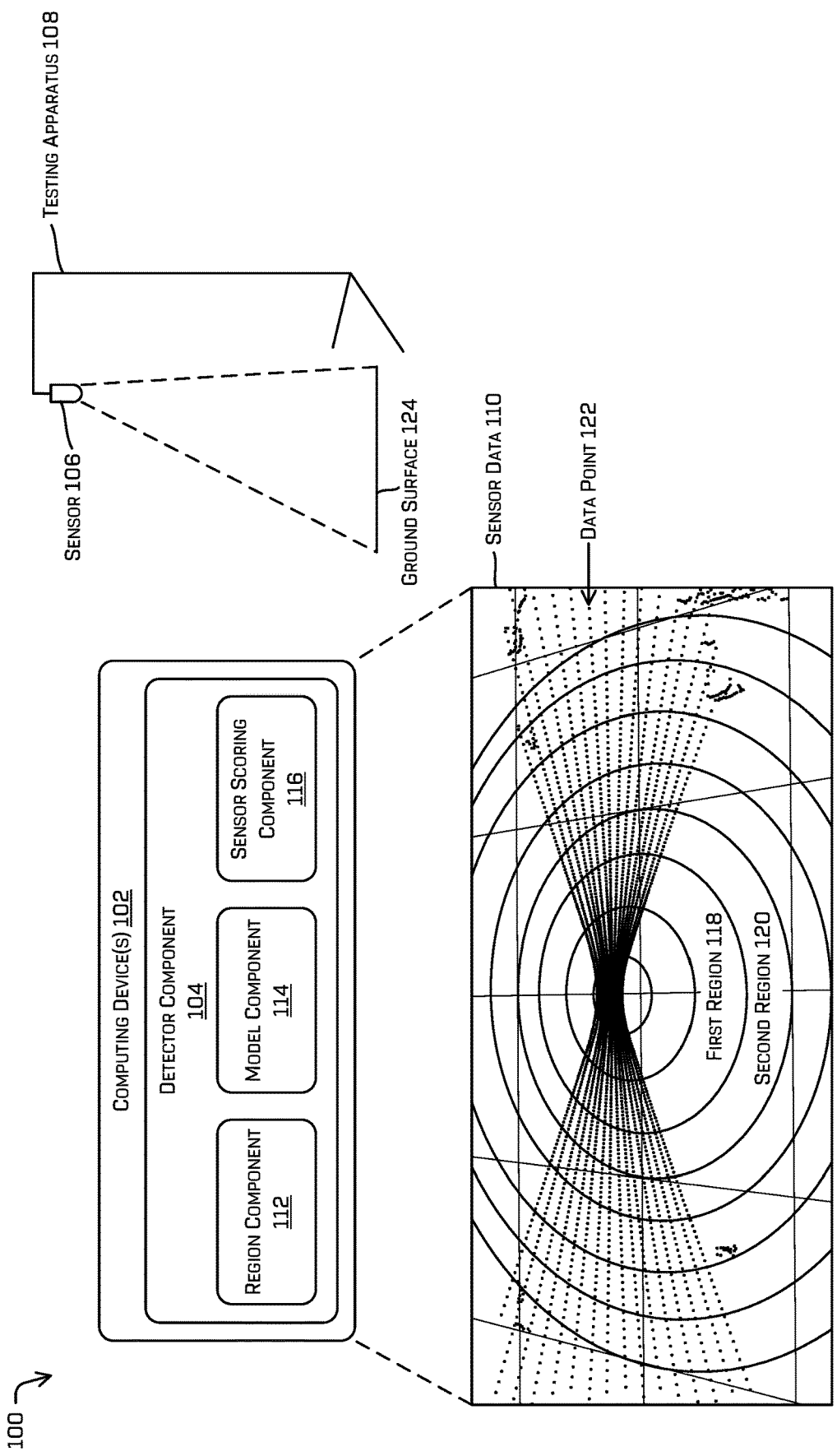
FIG. 1 is an illustration of an example environment in which an example detector component determines a calibration score for an example sensor.

Techniques for determining a calibration score associated with a sensor are discussed herein. Such sensors may include, but are not limited to, an image sensor, a lidar sensor, a time-of-flight sensor, a radar sensor, a sonar sensor, and the like. The techniques may include receiving sensor data representing an environment proximate the sensor. A computing device can segment the environment into multiple regions (e.g., regions of interest) at different distance ranges from the sensor. The computing device can determine a number of data points (e.g., lidar returns) in each region. In some examples, a number of data points in a particular region can be determined based on an average amount of data points detected in each region over time (e.g., over multiple lidar scans having corresponding regions). The computing device can implement a model to predict a calibration score for each region and the calibration scores for multiple regions can be used to determine a final calibration score indicating a level of accuracy of the sensor.

In the context of a lidar sensor, a computing device can receive multiple lidar scans associated with different times, and determine a number of lidar returns in corresponding regions of the lidar scans. For instance, each lidar scan can include a first region 1-2 meters from the lidar sensor and a second region 2-3 meters from the lidar sensor, and so on. The first region and the second region may be defined by an area between two concentric circles (or other shape) and the distance interval can be more or less than 1 meter. In various examples, the computing device can determine a calibration score for respective regions based on an average number of lidar returns detected in each region over time. The region calibration scores can be used to determine a confidence interval representing a range of calibration scores, and a final calibration score for the lidar sensor can be based at least in part on a calibration score in the range of calibration scores.

In various examples, the sensor can be removably coupled to a test apparatus (e.g., a tripod of other moving or stationary apparatus) that is configured to position the sensor at a same pose, height, and so on, as a sensor on an autonomous vehicle. By using the calibration determination techniques described herein, lidar sensors calibrated by a manufacturer can be verified for accuracy before being used by the autonomous vehicle to navigate in an environment (using a similar pose, height, etc.) thereby saving time that would otherwise be spent calibrating the sensor on the autonomous vehicle only to discover later that the sensor is poorly calibrated. In some examples, the calibration determination techniques can also or instead be used on the autonomous vehicle to determine whether the calibrated sensor loses performance over time after being installed on the autonomous vehicle.

As mentioned, a computing device can implement a model to predict a calibration score for multiple regions of an environment. The model can compare a number of data points in a respective region to previous calibration scores associated with vehicle data captured by an autonomous vehicle. For example, the model can receive vehicle data representing historical calibration scores for different regions surrounding the autonomous vehicle, and determine a curve or other representation of the vehicle data. In one example, the model can apply a logarithmic algorithm to the historical calibration scores to generate a curve, and the model can determine an intersection point at which the number of data points of a particular region intersects the curve. In some examples, the historical calibration score associated with the intersection point can be output by the model as the calibration score for the region. Examples of determining a probability of an error associated with a sensor (e.g., previous calibration scores for one or more regions), can be found, for example, in U.S. patent application Ser. No. 16/920,983 titled "Automated Detection of Sensor Miscalibration" filed Jul. 6, 2020, and in U.S. patent application Ser. No. 16/728,910 titled "Sensor Degradation Monitor" and filed Dec. 27, 2019, the entireties of which are herein incorporated by reference.

In examples when the sensor is coupled to the autonomous vehicle, a vehicle computing device can determine a suitable time to perform a sensor test such as when the autonomous vehicle is on a flat surface with asphalt. For example, to determine the historical calibration scores, the vehicle computing device can determine when to perform tests to capture test data similar to test conditions implemented by the test apparatus. For instance, the vehicle computing device can capture the test data based at least in part on the autonomous vehicle operating in an environment having a minimal amount of vehicles nearby (e.g., located on an empty highway, parking lot, etc.) and that includes surfaces having a predetermined reflectivity (e.g., to capture test data associated with a particular surface type, such as black asphalt).

In some examples, the model can receive vehicle data that includes one or more of: historical calibration scores of a region and/or a sensor, environmental data, coordinate data, pose data, historical sensor data, etc., usable for determining a curve, a function, or other mathematical representation of the vehicle data. For instance the model can output, generate, or otherwise determine a calibration score for each of multiple regions surrounding the sensor based on a comparison between the number of data points in a region to a curve representing historical calibration scores captured by the autonomous vehicle.

The test apparatus can be associated with a computing device that determines a confidence interval based at least in part on the calibration scores of the multiple regions output by the model. For example, the confidence interval can include a range of calibration scores by applying statistics to the calibration scores of the multiple regions. The confidence interval can, for instance, include a minimum calibration score and a maximum calibration score. In some examples, the computing device can generate the final calibration score of the sensor as a value between the minimum calibration score and the maximum calibration score. In one example, the computing device can output the final calibration score as the minimum calibration score of the confidence interval to conservatively predict an expected performance of the sensor (relative to the maximum calibration score).

In the context of a lidar sensor, a calibration score for a region can be based on a number of lidar points within the region, an intensity value of data within the region, a distance associated with data in the region, a comparison between captured data and reference data (e.g., when comparing an expected versus a measured number of data points), and the like.

To determine the final calibration score of a sensor, the computing device can count how many data points are captured, detected, or otherwise determined in regions that include a ground surface proximate the sensor. By determining an amount of data points in a variety of regions that include at least a portion of the ground surface, the final calibration score of the sensor can represent an ability for the sensor to accurately detect data points in an environment having low reflectivity (e.g., a black asphalt surface). Generally, the final calibration score of the sensor can account for environmental characteristics such as weather, ambient light, reflectivity of a surface, color of a surface, a time of day, and the like.

The sensor calibration techniques described herein can improve a functioning of a computing device by providing a robust method of estimating or otherwise determining a level of operation associated with a sensor. For example, determining whether a sensor is properly calibrated can allow subsequent processes associated with an autonomous vehicle (e.g., classification, tracking, prediction, route planning, trajectory generation, and the like) to be performed more accurately, may require less processing power, and/or may require less memory. In some instances, faster and/or more accurate segmentation can be used in generating a trajectory of the autonomous vehicle, which can improve safety for occupants of an autonomous vehicle. In some examples, the techniques can be used in a self-test operation associated with a system to evaluate a performance of the system which provides for greatly improved overall reliability and safety outcomes. Further, the techniques discussed herein may be incorporated into a system that can be validated for safety. These and other improvements to the functioning of the computing device are discussed herein.

The techniques described herein can be implemented in a number of ways. Example implementations are provided below with reference to the following figures. Although discussed in the context of an autonomous vehicle, the methods, apparatuses, and systems described herein can be applied to a variety of systems (e.g., a sensor system or a robotic platform), and are not limited to autonomous vehicles. In one example, similar techniques may be utilized in driver-controlled vehicles in which such a system may provide an indication of whether it is safe to perform various maneuvers. In another example, the techniques can be utilized in a manufacturing assembly line context, in an aerial surveying context, or in a nautical context. Additionally, the techniques described herein can be used with real data (e.g., captured using sensor(s)), simulated data (e.g., generated by a simulator), or any combination of the two.

FIG. 1 is an illustration of an example environment 100 in which an example detector component determines a calibration score for an example sensor. For instance, a computing device 102 can implement a detector component 104 to test performance of a sensor 106 coupled to a testing apparatus 108. The detector component 104 can receive sensor data 110 representing an environment proximate the testing apparatus 108, and determine a calibration score for the sensor 106 representing a level of accuracy of the sensor 106 (e.g., an ability of the sensor 106 to detect fixed and/or dynamic objects in the environment 100, an predicted or expected ability of the sensor to capture data that can be aligned, registered, or fused with other sensor data captured by other sensors, and the like).

The sensor 106 may include, but is not limited to, an image sensor, a lidar sensor, a time-of-flight sensor, a radar sensor, a sonar sensor, and the like. In various examples, the sensor 106 can be removably coupled to the test apparatus 108 at a same position, orientation, pose, etc. as a sensor that operates on an autonomous vehicle. Generally, the test apparatus 108 can represent a stand, tripod, and the like, that is capable of operating while in a fixed and/or moving position. The computing device 102 can send and/or receive data from the sensor 106 usable to perform the calibration techniques discussed herein.

As shown in FIG. 1, the detector component 104 includes a region component 112, a model component 114, and a sensor scoring component 116. The region component 112 includes functionality to segment, generate, or otherwise determine boundaries that define regions of various size and/or shape. For instance, in FIG. 1 the region component 112 can determine a first region 118 and a second region 120 defined by respective areas between concentric circles (which may be understood in at least some examples to constitute cylinders, e.g. when evaluating data having three dimensions). Accordingly, the first region 118 and the second region 120 are associated with different distance ranges from the sensor 106 located in the center of each circular boundary. Although FIG. 1 shows circular regions, other region shapes (e.g., square, rectangular, elliptical, etc.) are possible.

Regions determined by the region component 112 can include a first distance and a second distance from the sensor 106 that defines a distance range between the first distance and the second distance. In some examples, the first region 118 can begin two meters from the sensor 106 and end three meters from the sensor 106 while the second region 120 can be between three meters and four meters from the sensor

106. Thus, the first region 118 and the second region 120 can be associated with a distance range of 1 meter, however, in other examples the distance range for the regions determined by the region component 112 can vary relative to each other. Further, the region component 112 can generate regions having a distance range of less than or greater than 1 meter, and the distance range may vary between regions. As non-limiting examples, distances between successive regions may be exponentially increasing or decreasing in value with respect to distance from the sensor. In one example, the detector component 104 can generate 20 regions each having a distance range of 1 meter. Various size(s), number(s), shape(s), etc. of the regions are contemplated herein.

The model component 114 can be configured to determine a score for a region of the environment 100, such as the first region 118 or the second region 120. For instance, the model component 114 can determine a calibration score for the region (also referred to as a region score) based at least in part on a number of data points in each respective region. For instance, a data point 122 can represent a point detected by the sensor 106 (multiple data points are shown in FIG. 1). In the context of a lidar sensor, the data point 122 can be a lidar return captured or detected by the sensor 106. Generally, the model component 114 can be configured to apply a mathematical algorithm (e.g., a logarithmic algorithm), heuristics, and so on, to the number of data points in each region to calculate, generate, or otherwise determine the region score.

The sensor data can include, in various examples, detected data points associated with a ground surface 124 such as a roadway (e.g., a black asphalt surface or other road surface type). In this way, a calibration score for the sensor 106 can represent testing conditions that present a greater challenge (as compared to environments having higher reflectivity that the ground surface 124).

In some examples, the model component 114 can determine the region score based at least in part on a data metric (e.g., an average number of data points in a respective region over time, a median, a maximum, an average+1, minimum, average+/−standard deviation, etc.). For example, the sensor data 110 can represent several scans, image frames, or the like, captured by the sensor 106 at different times. In the context of a lidar sensor, lidar returns from the first region 118 can be averaged over two or more lidar scans, and the average number of lidar scans can be used to determine the region score. Additional discussion of the model component 114 can be found elsewhere including in FIGS. 2-4.

The sensor scoring component 116 can be configured to determine a calibration score for the sensor 106 based at least in part on the region scores associated with each region. For instance, the sensor scoring component 116 can receive an output(s) from the model component 114 (e.g., multiple region scores) indicating how well each region detects a signal transmitted from the sensor 106, reflected off a surface of a fixed or dynamic object, and returned to the sensor 106 as one or more data points within a region (e.g., the data point 122).

In some examples, the sensor scoring component 116 can generate the sensor calibration score based on determining a confidence interval representing a range of region scores. The confidence interval can be determined by using the region scores as sample points that include a minimum calibration score and a maximum calibration score. The sensor calibration score can be determined as a calibration score within the confidence interval. Discussion of the sensor scoring component 116 can be found elsewhere including in FIGS. 2-4.

Figure 2:
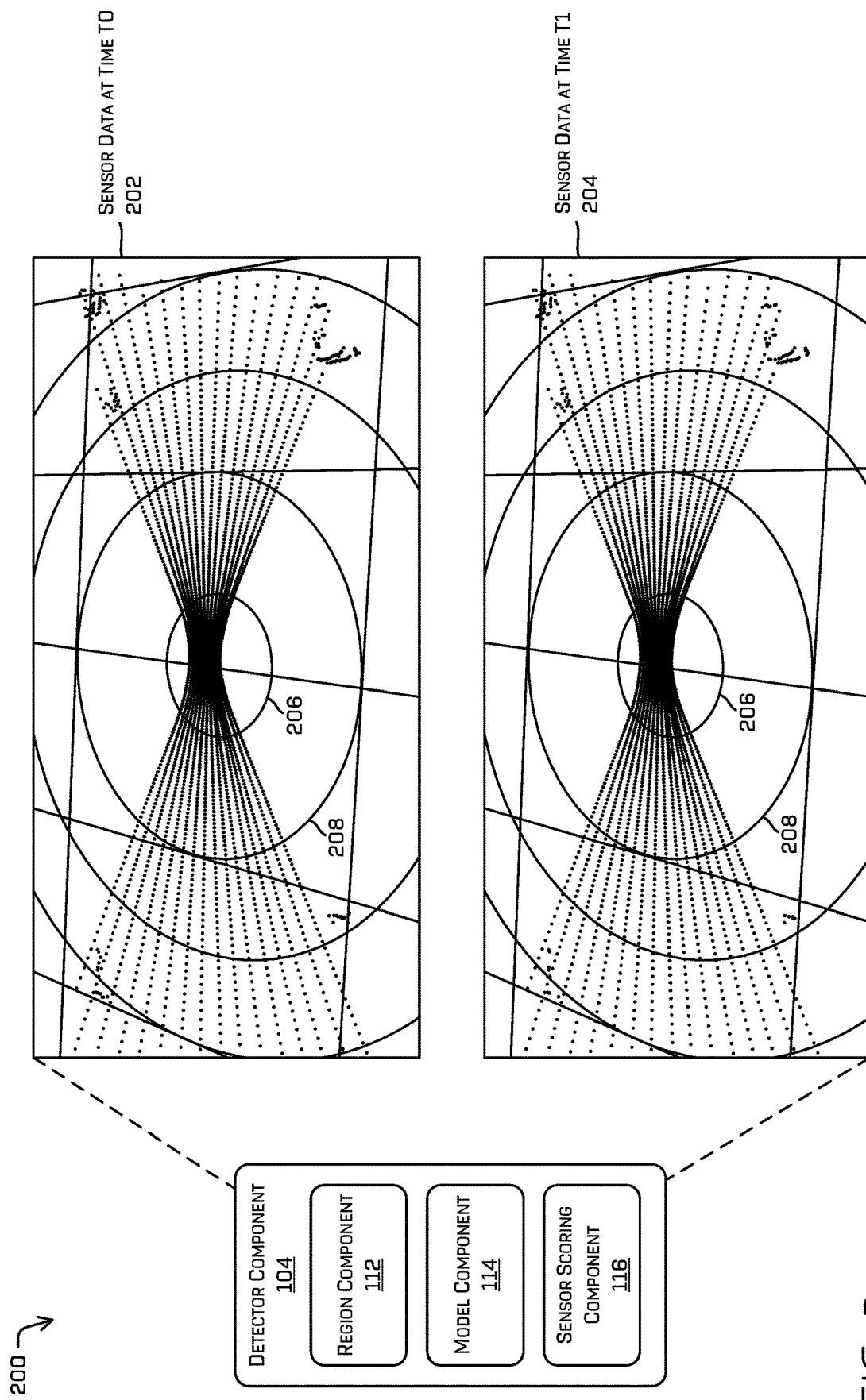
FIG. 2 is an illustration of an example detector component implementing example calibration techniques.

FIG. 2 is an illustration 200 of an example detector component implementing example calibration techniques. For instance, the detector component 104 can receive sensor data at time T0 202 and sensor data at time TI 204. In some examples, additional sensor data associated with additional times may also be received for processing. Thus, the detector component 104 can determine a score for the sensor 106 based on sensor data received over time.

As illustrated, the sensor data at time T0 202 and the sensor data at time TI 204 can be associated with a first region 206 and a second region 208. For example, the region component 112 can generate the first region 206 and the second region 208 based at least in part on sensor data received over time from the sensor 106. The first region 206 and the second region 208 can be located at different distances from the sensor 106 located at a center of each region. In some examples, the first region 206 and the second region 208 can include at least a portion of a ground surface. The detector component 104 can perform a calibration operation over a variety of environmental conditions (e.g., ambient light, time of data, temperature, weather, and the like) to allow for normalization of data. In some such examples, such a calibration may be unique to a particular environmental condition whereas in other examples the model may aggregate data over the variety of environmental conditions such that it can be used in any environmental condition.

The model component 114 can determine a number of data points in the first region 206 and the second region 208 based at least in part on averaging an amount of data points in each respective region at time T0 and at time TI. By averaging data points in each respective region over time, the detector component 104 can implement the model component 114 to predict a region score that reflects performance of the sensor 106 relative to the region. In various examples, the region score can be determined based at least in part on comparing the average data points in each respective region relative to previous region calibration scores. In such examples, the previous region calibration scores can be determined based on test(s) performed by a vehicle computing device associated with a vehicle. For instance, the model component 114 can determine an intersection point between a value representing the average number of data points and a curve representing the previous calibration scores. In some examples, the model component 114 can generate a curve by fitting a logarithmic function to each of the previous region calibration scores received from the vehicle. Of course, any other function is contemplated (e.g., linear, non-linear, etc.).

The sensor scoring component 116 can predict a final calibration score for the sensor 106 based at least in part on a first score associated with the first region 206 and a second score associated with the second region 208. Generally, the sensor scoring component 116 can apply statistics, heuristics, and so on, to the first score and the second score to output the final calibration score. For example, the sensor scoring component 116 can receive multiple calibration scores (e.g., one for each region) and apply statistics to those calibration scores (e.g., 0.9, 0.9, 0.8, 0.7, 0.9) to generate a predicted calibration score (e.g., 0.85 with 90% confidence). In at least some examples, various regions may be weighted differently. As a non-limiting example, calibration scores for regions associated with a lidar sensor from approximately 3 meters to approximately 20 meters may more strongly contribute to the sensor calibration score than data outside of those regions. Such weighting can be linear, non-linear, or otherwise. In such a case, discrepancies between the model and the number of points may carry greater significance in the higher weighted regions when determining a calibration score for the sensor. The weight applied to a region may be based at least in part on a distance of the region from the sensor. In various examples, a calibrations score of a region further from the sensor can be weighted higher than a calibration score of a region closer to the sensor.

While FIG. 2 shows data points associated with less than a 360 degrees view; in some examples it is understood that the sensor 106 can capture data points at approximately 360 degrees. For instance, a lidar sensor can scan the environment at 360 degrees and determine lidar returns accordingly.

Figure 3:
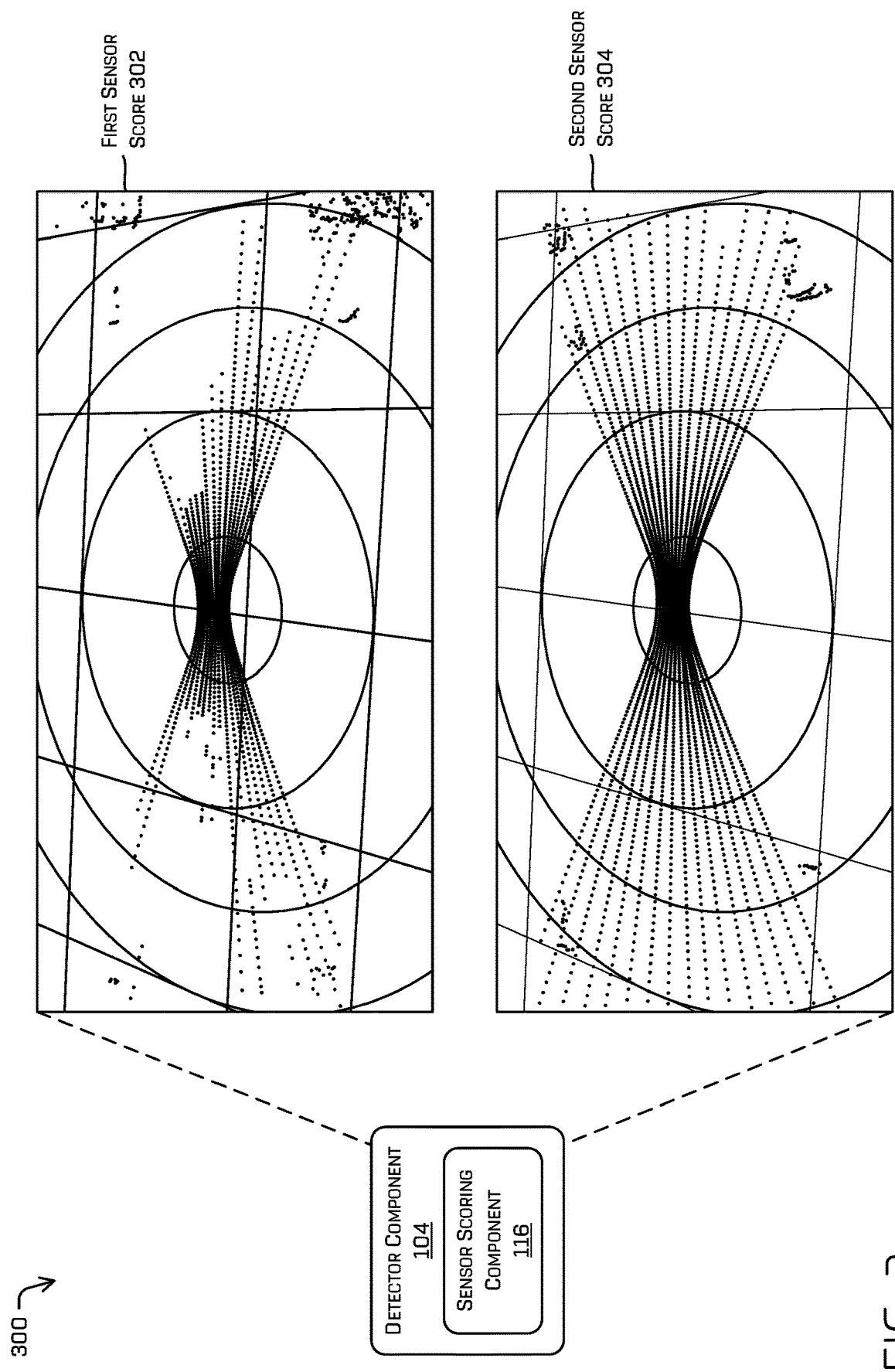
FIG. 3 is another illustration of an example detector component implementing example calibration techniques.

FIG. 3 is an illustration 300 of an example detector component implementing example calibration techniques. For instance, the sensor scoring component 116 can predict a first sensor score 302 and a second sensor score 304 indicating a level of accuracy of the sensor 106 at different times. In some examples, the first sensor score 302 and the second sensor score 304 can be associated with different sensors and can represent a final calibration score that is based on individual region calibration scores.

The first sensor score 302 can represent a relatively low score (e.g., a calibration score less than 95%) while the second sensor score 304 can represent a relatively high score (e.g., a calibration score greater than 99%). Generally, the first sensor score 302 and the second sensor score 304 are based on a number of detected data points in respective regions proximate to the sensor 106. As shown in FIG. 3, the first sensor score 302 is associated with fewer data points (e.g., lidar returns) than the second sensor score 304.

In some examples, the detector component 104 can determine a pass status or a fail status for a sensor based at least in part on an associated sensor score. For instance, a sensor can have a pass status when the first sensor score 302 or the second sensor score 304 is above a score threshold (e.g., 99%) or a fail status when the first sensor score 302 or the second sensor score 304 is equal to or below the score threshold. The pass status and the fail status can be used to determine whether the associated sensor is sufficiently accurate to install on a robotic device such as an autonomous vehicle. In some examples, the calibration score for a sensor can be used to enable subsequent processes associated with the autonomous vehicle (e.g., classification, tracking, prediction, route planning, trajectory generation, and the like) to be performed more accurately. Additionally, the sensor calibration score of a sensor subsequently installed on an autonomous vehicle can help reduce downtime (e.g. being offline and unavailable) to fix or repair a sensor that was not tested as described herein. In examples when the autonomous vehicle is part of a fleet of vehicles providing a ride service, reducing downtime can significantly improve an amount of time the autonomous vehicle is available for hire (e.g., due to the days is can require to calibrate a newly installed sensor).

Figure 4:
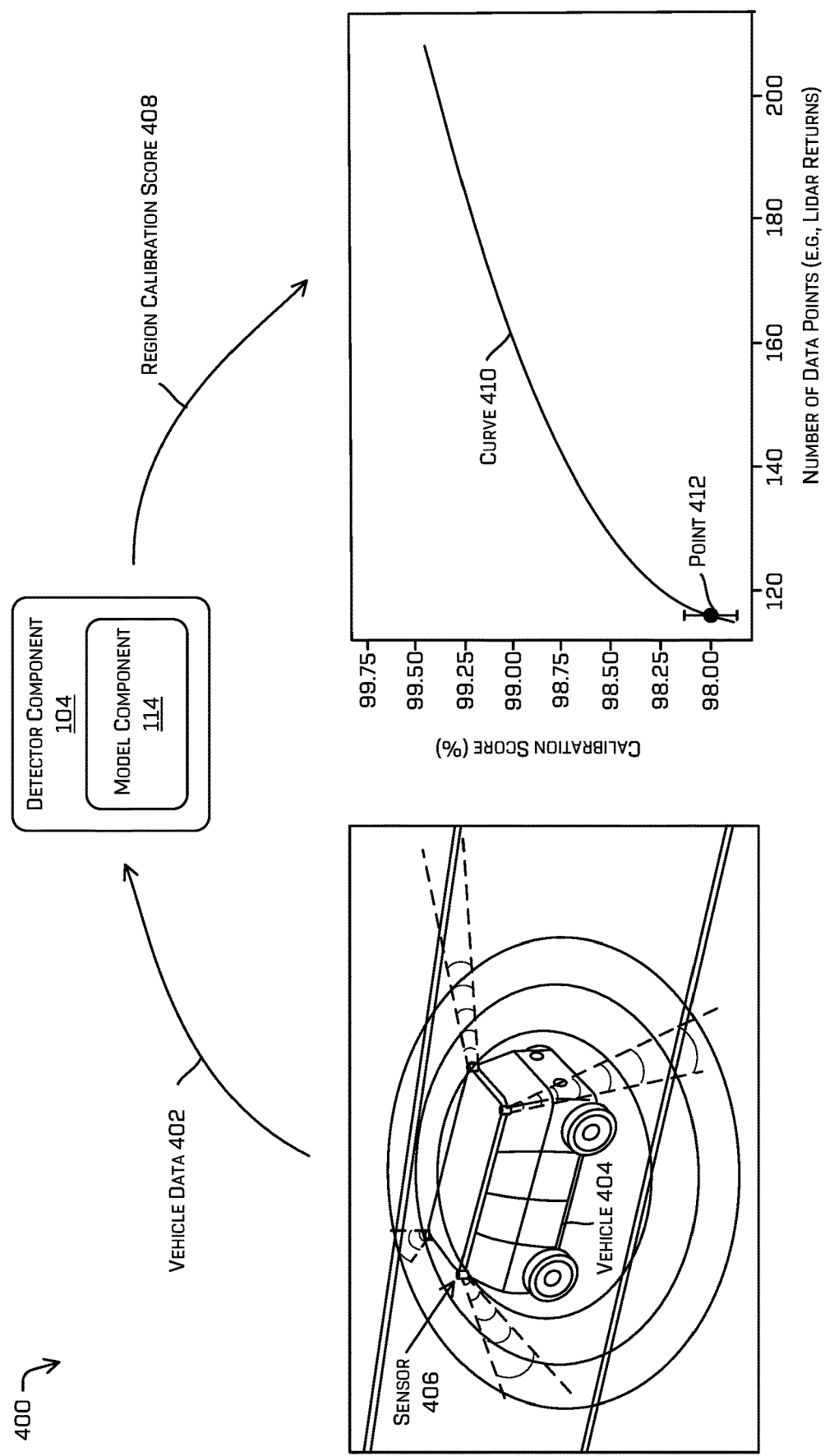
FIG. 4 is an illustration of an example model component determining a calibration scores for an example region in an example environment.

FIG. 4 is an illustration of an example model component determining calibration scores for one or more example regions of an example environment. For instance, the model component 114 can receive vehicle data 402 from a vehicle 404 representing previous calibration scores associated with a sensor 406. The model component 114 can also receive a number of data points within a region (e.g., the first region 118 or the second region 120) determined based on the sensor data 110. As explained in more detail below and elsewhere, the model component 114 can determining a region calibration score 408 for a region associated with the sensor data 110 based at least in part on a curve 410 that is determining based on the vehicle data 402.

Generally, the vehicle data 402 can include one or more of: historical calibration scores of a region and/or a sensor, environmental data, coordinate data, pose data, historical sensor data, etc. The vehicle data 402 can represent historical data captured over time and evaluated with respect to a performance of subsequent processing, such as via a perception component, a localization component, a prediction component, and the like, as discussed herein. The vehicle data 402 may represent data captured, evaluated, or otherwise determined based on real data and/or simulated degraded sensors and/or environmental conditions. Examples of determining a calibration score by a vehicle can be found, for example, in U.S. patent application Ser. No. 15/674,853 titled "Vehicle Sensor Calibration and Localization" filed Aug. 11, 2017, the entirety of which is herein incorporated by reference. In some examples, a calibration score determined by the vehicle 404 (e.g., a historical calibration score) can represent a metric associated with how well the sensor data from multiple sensors can be aligned, registered, fused, etc.

The vehicle data 402 may be captured by the vehicle 404 based at least in part on environmental characteristics (e.g., weather conditions, a number of objects proximate the vehicle, a surface type, an incline associated with a ground surface, and the like). The vehicle data 402 may be captured responsive to the vehicle 404 being located on a flat surface with few or no objects within a threshold distance of the vehicle 404. Of course, the vehicle data 402 may also or instead be captured at predetermined time intervals regardless of the environmental characteristics.

In various examples, the sensor 406 associated with the vehicle data 402 may be a different sensor as the sensor 106 associated with the sensor data 110. The sensor 406 and the sensor 106 may be a same sensor type (e.g., both lidar sensors from a same manufacturer). In various examples, the sensor 406 and the sensor 106 may be associated with different regions having a same distance range. For instance, regions of corresponding size and shape may be associated with the sensor 406 and the sensor 106, and the regions may include at least a portion of a ground surface.

In some examples, the model component 114 can determine the curve 410 based at least in part on fitting a mathematical algorithm (e.g., a logarithmic algorithm) to the vehicle data 402. As shown in FIG. 4, the curve 410 can represent a plot of calibration scores associated with a region proximate the vehicle 404 and/or calibration scores associated with the sensor 406. By way of example and not limitation, the curve 410 can represent a previously determined region calibration score from a vehicle computing device associated with the vehicle 404. In various examples, the previous region calibration score can correspond to a region that includes at least a portion of a ground surface proximate the vehicle 404, and the region can have similar characteristics as the region associated with the sensor data 110 (e.g., the previous calibration score can be associated with a region 2-3 meters from the vehicle 404 and the number of data points can be associated with a different region 2-3 meters from the sensor 106).

The model component 114 can determine a relationship between the curve 410 and the number of data points (or the average number of data points), and output the region calibration score 408 based at least in part on the relationship. For instance, the model component 114 can compare the number of data points within the region (e.g., the first region 118 or the second region 120 determined based on the sensor data 110) to the curve 410. A point 412 can be determined by the model component 114 based at least in part on identifying a point at which the number of data points intersects with the curve 410. In some examples, the number of data points can be based on an average number of data points in the region (e.g., the first region 118 or the second region 120) over time and the historical calibration scores for a region surrounding the vehicle 404 can be a range of scores determined for the region over time (e.g., as shown by the range of calibration scores associated with the point 412).

In one example, the model component 114 can determine the curve 410 using the following equation.

$$Y = b + (a * \ln(x)) \tag{1}$$

In equation 1, Y is the region calibration score 408 for a region. In such examples, a is a log intercept, b is a log scaler, and x is the number of data points.

In some examples, an individual data point in the number of data points associated with the vehicle data 402 and/or the sensor data 110 can include a lidar return associated with a channel or beam index, an azimuth bin or angle, an intensity value, and/or a distance. Thus, the channel or beam index, the azimuth bin or angle, the intensity value, and/or the distance of the lidar return can be considered when the model component 114 determines a historical calibration score for a region and/or the region calibration score 408.

In some examples, the historical calibration score for the region determined by the vehicle computing device of the vehicle 404 can represent a measured calibration score based at least in part on calibrating the sensor 406 with another sensor of the vehicle 404. The region calibration score 408 predicted by the model component 114 can be based at least in part on the measured calibration score. The measured calibration score can be based at least in part on a comparison between data captured by the vehicle 404 and reference data (e.g., using an iterative closest point (ICP) algorithm).

Figure 5:
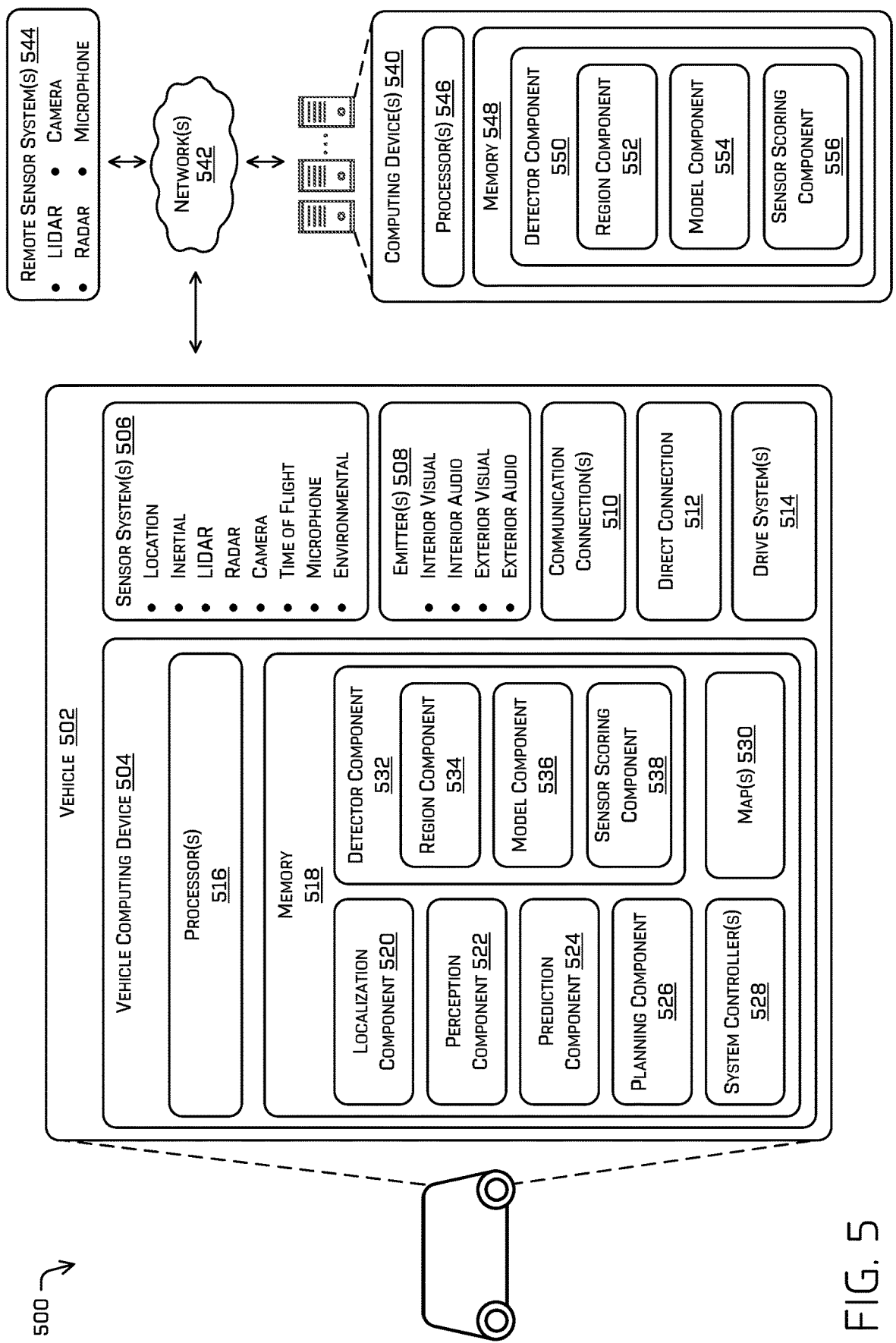
FIG. 5 is a block diagram of an example system for implementing the techniques described herein.

FIG. 5 is a block diagram of an example system 500 for implementing the techniques described herein. In at least one example, the system 500 can include a vehicle 502. In the illustrated example system 500, the vehicle 502 is an autonomous vehicle: however, the vehicle 502 can be any other type of vehicle.

The vehicle 502 can be a driverless vehicle, such as an autonomous vehicle configured to operate according to a Level 5 classification issued by the U.S. National Highway Traffic Safety Administration, which describes a vehicle capable of performing all safety-critical functions for the entire trip, with the driver (or occupant) not being expected to control the vehicle at any time. In such examples, because the vehicle 502 can be configured to control all functions from start to completion of the trip, including all parking functions, it may not include a driver and/or controls for driving the vehicle 502, such as a steering wheel, an acceleration pedal, and/or a brake pedal. This is merely an example, and the systems and methods described herein may be incorporated into any ground-borne, airborne, or water-borne vehicle, including those ranging from vehicles that need to be manually controlled by a driver at all times, to those that are partially or fully autonomously controlled.

The vehicle 502 can include one or more computing device(s) 504, one or more sensor system(s) 506, one or more emitter(s) 508, one or more communication connection(s) 510 (also referred to as communication devices and/or modems), at least one direct connection 512 (e.g., for physically coupling with the vehicle 502 to exchange data and/or to provide power), and one or more drive system(s) 514. The one or more sensor system(s) 506 can be configured to capture sensor data associated with an environment.

The one or more sensor system(s) 506 can include time-of-flight sensors, location sensors (e.g., GPS, compass, etc.), inertial sensors (e.g., inertial measurement units (IMUs), accelerometers, magnetometers, gyroscopes, etc.), lidar sensors, radar sensors, sonar sensors, infrared sensors, cameras (e.g., RGB, IR, intensity, depth, etc.), microphone sensors, environmental sensors (e.g., temperature sensors, humidity sensors, light sensors, pressure sensors, etc.), ultrasonic transducers, wheel encoders, etc. The one or more sensor system(s) 506 can include multiple instances of each of these or other types of sensors. For instance, the time-of-flight sensors can include individual time-of-flight sensors located at the corners, front, back, sides, and/or top of the vehicle 502. As another example, the camera sensors can include multiple cameras disposed at various locations about the exterior and/or interior of the vehicle 502. The one or more sensor system(s) 506 can provide input to the computing device 504.

The vehicle 502 can also include one or more emitter(s) 508 for emitting light and/or sound. The one or more emitter(s) 508 in this example include interior audio and visual emitters to communicate with passengers of the vehicle 502. By way of example and not limitation, interior emitters can include speakers, lights, signs, display screens, touch screens, haptic emitters (e.g., vibration and/or force feedback), mechanical actuators (e.g., seatbelt tensioners, seat positioners, headrest positioners, etc.), and the like. The one or more emitter(s) 508 in this example also include exterior emitters. By way of example and not limitation, the exterior emitters in this example include lights to signal a direction of travel or other indicator of vehicle action (e.g., indicator lights, signs, light arrays, etc.), and one or more audio emitters (e.g., speakers, speaker arrays, horns, etc.) to audibly communicate with pedestrians or other nearby vehicles, one or more of which may comprise acoustic beam steering technology.

The vehicle 502 can also include one or more communication connection(s) 510 that enable communication between the vehicle 502 and one or more other local or remote computing device(s) (e.g., a remote teleoperation computing device) or remote services. For instance, the one or more communication connection(s) 510 can facilitate communication with other local computing device(s) on the vehicle 502 and/or the one or more drive system(s) 514. Also, the one or more communication connection(s) 510 can allow the vehicle 502 to communicate with other nearby computing device(s) (e.g., other nearby vehicles, traffic signals, etc.).

The one or more communications connection(s) 510 can include physical and/or logical interfaces for connecting the computing device 504 to another computing device or one or more external networks 542 (e.g., the Internet). For example, the one or more communications connection(s) 510 can enable Wi-Fi-based communication such as via frequencies defined by the IEEE 802.11 standards, short range wireless frequencies such as Bluetooth, cellular communication (e.g., 2G, 3G, 4G, 4G LTE, 5G, etc.), satellite communication, dedicated short-range communications (DSRC), or any suitable wired or wireless communications protocol that enables the respective computing device to interface with the other computing device(s).

In at least one example, the vehicle 502 can include one or more drive system(s) 514. In some examples, the vehicle 502 can have a single drive system 514. In at least one example, if the vehicle 502 has multiple drive systems 514, individual drive systems 514 can be positioned on opposite ends of the vehicle 502 (e.g., the front and the rear, etc.). In at least one example, the drive system(s) 514 can include one or more sensor system(s) 506 to detect conditions of the drive system(s) 514 and/or the surroundings of the vehicle 502. By way of example and not limitation, the sensor system(s) 506 can include one or more wheel encoders (e.g., rotary encoders) to sense rotation of the wheels of the drive systems, inertial sensors (e.g., inertial measurement units, accelerometers, gyroscopes, magnetometers, etc.) to measure orientation and acceleration of the drive system, cameras or other image sensors, ultrasonic sensors to acoustically detect objects in the surroundings of the drive system, lidar sensors, radar sensors, etc. Some sensors, such as the wheel encoders can be unique to the drive system(s) 514. In some cases, the sensor system(s) 506 on the drive system(s) 514 can overlap or supplement corresponding systems of the vehicle 502 (e.g., sensor system(s) 506).

The drive system(s) 514 can include many of the vehicle systems, including a high voltage battery, a motor to propel the vehicle, an inverter to convert direct current from the battery into alternating current for use by other vehicle systems, a steering system including a steering motor and steering rack (which can be electric), a braking system including hydraulic or electric actuators, a suspension system including hydraulic and/or pneumatic components, a stability control system for distributing brake forces to mitigate loss of traction and maintain control, an HVAC system, lighting (e.g., lighting such as head/tail lights to illuminate an exterior surrounding of the vehicle), and one or more other systems (e.g., cooling system, safety systems, onboard charging system, other electrical components such as a DC/DC converter, a high voltage junction, a high voltage cable, charging system, charge port, etc.). Additionally, the drive system(s) 514 can include a drive system controller which can receive and preprocess data from the sensor system(s) 506 and to control operation of the various vehicle systems. In some examples, the drive system controller can include one or more processor(s) and memory communicatively coupled with the one or more processor(s). The memory can store one or more components to perform various functionalities of communication connection(s) that enable communication by the respective drive system with one or more other local or remote computing device(s).

The computing device 504 can include one or more processor(s) 516 and memory 518 communicatively coupled with the one or more processor(s) 516. In the illustrated example, the memory 518 of the computing device 504 stores a localization component 520, a perception component 522, a prediction component 524, a planning component 526, one or more system controllers 528, one or more maps 530, and a detector component 532 including a region component 534, a model component 536, and a sensor scoring component 538. Though depicted as residing in the memory 518 for illustrative purposes, it is contemplated that the localization component 520, the perception component 522, the prediction component 524, the planning component 526, the one or more system controllers 528, the one or more maps 530, the detector component 532, the region component 534, the model component 536, and the sensor scoring component 538 may additionally, or alternatively, be accessible to the vehicle 502 (e.g., stored on, or otherwise accessible by, memory remote from the vehicle 502, such as, for example, on memory 548 of a remote computing device 540).

In at least one example, the localization component 520 may include functionality to receive data from the sensor system(s) 506 to determine a position and/or orientation of the vehicle 502 (e.g., one or more of an x-, y-, z-position, roll, pitch, or yaw). For example, the localization component 520 may include and/or request/receive a map of an environment, such as from map(s) 530 and/or a remote map component, and may continuously determine a location and/or orientation of the autonomous vehicle within the map. In some instances, the localization component 520) may utilize SLAM (simultaneous localization and mapping), CLAMS (calibration, localization and mapping, simultaneously), relative SLAM, bundle adjustment, non-linear least squares optimization, or the like to receive image data, lidar data, radar data, IMU data, GPS data, wheel encoder data, and the like to accurately determine a location of the autonomous vehicle. In some instances, the localization component 520 may provide data to various components of the vehicle 502 to determine an initial position of an autonomous vehicle for determining the relevance of an object to the vehicle 502, as discussed herein.

In some instances, the perception component 522 may include functionality to perform object detection, segmentation, and/or classification. In some examples, the perception component 522 may provide processed sensor data that indicates a presence of an object (e.g., entity) that is proximate to the vehicle 502 and/or a classification of the object as an object type (e.g., car, pedestrian, cyclist, animal, building, tree, road surface, curb, sidewalk, unknown, etc.). In some examples, the perception component 522 may provide processed sensor data that indicates a presence of a stationary entity that is proximate to the vehicle 502 and/or a classification of the stationary entity as a type (e.g., building, tree, road surface, curb, sidewalk, unknown, etc.). In additional or alternative examples, the perception component 522 may provide processed sensor data that indicates one or more features associated with a detected object (e.g., a tracked object) and/or the environment in which the object is positioned. In some examples, features associated with an object may include, but are not limited to, an x-position (global and/or local position), a y-position (global and/or local position), a z-position (global and/or local position), an orientation (e.g., a roll, pitch, yaw), an object type (e.g., a classification), a velocity of the object, an acceleration of the object, an extent of the object (size), etc. Features associated with the environment may include, but are not limited to, a presence of another object in the environment, a state of another object in the environment, a time of day, a day of a week, a season, a weather condition, an indication of darkness/light, etc.

The prediction component 524 can generate one or more probability maps representing prediction probabilities of possible locations of one or more objects in an environment. For example, the prediction component 524 can generate one or more probability maps for vehicles, pedestrians, animals, and the like within a threshold distance from the vehicle 502. In some instances, the prediction component 524 can measure a track of an object and generate a discretized prediction probability map, a heat map, a probability distribution, a discretized probability distribution, and/or a trajectory for the object based on observed and predicted behavior. In some instances, the one or more probability maps can represent an intent of the one or more objects in the environment.

In some examples, the prediction component 524 may generate predicted trajectories of objects (e.g., objects) in an environment and/or to generate predicted candidate trajectories for the vehicle 502. For example, the prediction component 524 may generate one or more predicted trajectories for objects within a threshold distance from the vehicle 502. In some examples, the prediction component 524 may measure a trace of an object and generate a trajectory for the object based on observed and predicted behavior.

In general, the planning component 526 may determine a path for the vehicle 502 to follow to traverse through an environment. For example, the planning component 526 may determine various routes and trajectories and various levels of detail. For example, the planning component 526 may determine a route to travel from a first location (e.g., a current location) to a second location (e.g., a target location). For the purpose of this discussion, a route may include a sequence of waypoints for travelling between two locations. As non-limiting examples, waypoints include streets, intersections, global positioning system (GPS) coordinates, etc. Further, the planning component 526 may generate an instruction for guiding the autonomous vehicle along at least a portion of the route from the first location to the second location. In at least one example, the planning component 526 may determine how to guide the autonomous vehicle from a first waypoint in the sequence of waypoints to a second waypoint in the sequence of waypoints. In some examples, the instruction may be a candidate trajectory, or a portion of a trajectory. In some examples, multiple trajectories may be substantially simultaneously generated (e.g., within technical tolerances) in accordance with a receding horizon technique. A single path of the multiple paths in a receding data horizon having the highest confidence level may be selected to operate the vehicle. In various examples, the planning component 526 can select a trajectory for the vehicle 502 based at least in part on receiving data representing an output of the detector component 532.

In other examples, the planning component 526 can alternatively, or additionally, use data from the localization component 520, the perception component 522, and/or the prediction component 524 to determine a path for the vehicle 502 to follow to traverse through an environment. For example, the planning component 526 can receive data from the localization component 520, the perception component 522, and/or the prediction component 524 regarding objects associated with an environment. Using this data, the planning component 526 can determine a route to travel from a first location (e.g., a current location) to a second location (e.g., a target location) to avoid objects in an environment. In at least some examples, such a planning component 526 may determine there is no such collision free path and, in turn, provide a path which brings vehicle 502 to a safe stop avoiding all collisions and/or otherwise mitigating damage. Additionally or alternatively, the planning component 526 can determine the path for the vehicle 502 to follow based at least in part on data received from the simulation component 202 and/or the detector component 532 as described in FIGS. 1-4 and elsewhere.

In at least one example, the vehicle computing device 504 may include one or more system controllers 528, which may be configured to control steering, propulsion, braking, safety, emitters, communication, and other systems of the vehicle 502. The system controller(s) 528 may communicate with and/or control corresponding systems of the drive system(s) 514 and/or other components of the vehicle 502.

The memory 518 may further include one or more maps 530 that may be used by the vehicle 502 to navigate within the environment. For the purpose of this discussion, a map may be any number of data structures modeled in two dimensions, three dimensions, or N-dimensions that are capable of providing information about an environment, such as, but not limited to, topologies (such as intersections), streets, mountain ranges, roads, terrain, and the environment in general. In some instances, a map may include, but is not limited to: texture information (e.g., color information (e.g., RGB color information, Lab color information, HSV/HSL color information), and the like), intensity information (e.g., lidar information, radar information, and the like); spatial information (e.g., image data projected onto a mesh, individual "surfels" (e.g., polygons associated with individual color and/or intensity)), reflectivity information (e.g., specularity information, retroreflectivity information, BRDF information, BSSRDF information, and the like). In one example, a map may include a three-dimensional mesh of the environment. In some examples, the vehicle 502 may be controlled based at least in part on the map(s) 530. That is, the map(s) 530 may be used in connection with the localization component 520, the perception component 522, the prediction component 524, and/or the planning component 526 to determine a location of the vehicle 502, detect objects in an environment, generate routes, determine actions and/or trajectories to navigate within an environment.

In some examples, the one or more maps 530 may be stored on a remote computing device(s) (such as the computing device(s) 540) accessible via network(s) 542. In some examples, multiple maps 530 may be stored based on, for example, a characteristic (e.g., type of entity, time of day, day of week, season of the year, etc.). Storing multiple maps 530 may have similar memory requirements, but increase the speed at which data in a map may be accessed.

As illustrated in FIG. 5, the vehicle computing device 504 may include the detector component 532 configured to perform the functionality of the detector component 104, including predicting a calibration score for a sensor of the sensor system(s) 506. In various examples, the detector component 532 may receive sensor data, vehicle data (e.g., the vehicle data 402), and the like from the perception component 522 and/or from the sensor system(s) 506. In some examples, the detector component 532 may receive environment characteristics (e.g., environmental factors, etc.) and/or weather characteristics (e.g., weather factors such as snow; rain, ice, etc.) from the perception component 522 and/or the sensor system(s) 506. While shown separately in FIG. 5, the detector component 532 could be part of the prediction component 524, the planning component 526, or other component(s) of the vehicle 502.

In various examples, the detector component 532 can perform a calibration operation to determine if an individual sensor of the vehicle 502 is faulty. For instance, the detector component 532 can determine a calibration score for a sensor (or region of the sensor) based at least in part on calibrating a first sensor relative to a second sensor of the vehicle 404. In examples when a calibration error is detected between the first sensor and the second sensor, the detector component 532 can perform a test to determine if the fault is associated with the first sensor or the second sensor.

The region component 534 can include functionality to determine regions in an environment surrounding the vehicle 502. For example, the region component 534 can segment the environment into multiple regions having respective distance ranges. In some examples, each region can be at a different distance from a sensor of the sensor system(s) 506 and can have a same or different distance range. For instance, the region component 534 can include at least the functionality of the region component 112.

The model component 536 can include functionality to determine calibration scores for regions in the environment surrounding the vehicle 502. For instance, the model component 536 can include at least the functionality of the model component 114. In various examples, the model component 536 can generate, access, or otherwise determine a curve (e.g., the curve 410) to represent previous calibration scores for a region, and determine a region calibration score based at least in part on the curve. An additional curve can be generated to determine another region calibration score for a different region.

The sensor scoring component 538 can include functionality to determine a calibration score for a sensor of the sensor system(s) 506 associated with the vehicle 502. For instance, the sensor scoring component 538 can include at least the functionality of the sensor scoring component 116. In some examples, the sensor scoring component 538 can determine a final calibration score for each of multiple sensors coupled to the vehicle 404 based at least in part on receiving region calibration scores from the model component 536.

In some examples, the vehicle 502 may send sensor data to the computing device(s) 540 via the network(s) 542. In some examples, the vehicle 502 may receive sensor data from the computing device(s) 540 and/or remote sensor system(s) 544 via the network(s) 542. The sensor data may include raw sensor data and/or processed sensor data and/or representations of sensor data. In some examples, the sensor data (raw or processed) may be sent and/or received as one or more log files. In one example, the sensor data can correspond to the vehicle data 402 and can include historical calibration scores for one or more sensors.

The computing device(s) 540 may include processor(s) 546 and a memory 548 storing a detector component 550, a region component 552, a model component 554, and a sensor scoring component 556. In various examples, the detector component 550 may be configured to receive data from one or more remote sensors, such as the sensor system(s) 506 and/or remote sensor system(s) 544. In some examples, the detector component 550 may be configured to process the data and send processed sensor data to the vehicle computing device 504, such as for use by the perception component 522, the prediction component 524, and/or the planning component 526. In some examples, the detector component 550 may be configured to send calibration score data to the vehicle computing device 504.

The detector component 550 can be configured to perform the functionality of the detector component 104, including predicting a calibration score for a sensor remote from the vehicle 502. For instance, a determination to install the sensor 106 on the vehicle 502 can be based at least in part on the predicted calibration score and/or the confidence interval meeting or exceeding a threshold.

The region component 552 can include functionality to determine regions in an environment surrounding a sensor associated with the computing device(s) 540 (e.g., the sensor 106). For example, the region component 552 can segment the environment proximate the sensor 106 into multiple regions having respective distance ranges. In some examples, each of the multiple regions can be at a different distances from the sensor and can have a same or different distance range. In some examples, the region component 552 can include at least the functionality of the region component 112.

The model component 554 can include functionality to determine calibration scores for regions in the environment surrounding the sensor (e.g., the sensor 106). For instance, the model component 554 can include at least the functionality of the model component 114 including generating a curve (e.g., the curve 410) to represent previous calibration scores for a region, and determining a region calibration score based at least in part on the curve.

The sensor scoring component 556 can include functionality to determine a calibration score for a sensor associated with the computing device(s) 540. For instance, the sensor scoring component 556 can include at least the functionality of the sensor scoring component 116. In some examples, the sensor scoring component 556 can determine a final calibration score for the sensor based at least in part on receiving region calibration scores from the model component 554.

As can be understood, the components discussed herein (e.g., the detector component 550, the region component 552, the model component 554, and the sensor scoring component 556) are described as divided for illustrative purposes. However, the operations performed by the various components may be combined or performed in any other component.

Determinations by the detector component 532 and/or the detector component 550 can be used by various components of the vehicle computing device 504. For example, calibration scores associated with a region and/or a sensor can be used to cause the vehicle 502 to take an action (e.g., a relatively low score can cause the vehicle to stop, pull over, etc., determine a maximum speed for the vehicle to operate, etc.) and/or cause a change in sensor contributions (e.g., a poorly operating sensor can contribute less to sensor fusion).

While examples are given in which the techniques described herein are implemented by a detector component of the vehicle, in some examples, some or all of the techniques described herein could be implemented by another system of the vehicle, such as a secondary safety system. Generally, such an architecture can include a first computing device to control the vehicle 502 and a secondary safety system that operates on the vehicle 502 to validate operation of the primary system and to control the vehicle 502 to avoid collisions.

In some instances, aspects of some or all of the components discussed herein may include any models, techniques, and/or machine learned techniques. For example, in some instances, the components in the memory 518 (and the memory 548, discussed below) may be implemented as a neural network.

As described herein, an exemplary neural network is a technique which passes input data through a series of connected layers to produce an output. Each layer in a neural network may also comprise another neural network, or may comprise any number of layers (whether convolutional or not). As can be understood in the context of this disclosure, a neural network may utilize machine learning, which may refer to a broad class of such techniques in which an output is generated based on learned parameters.

Although discussed in the context of neural networks, any type of machine learning may be used consistent with this disclosure. For example, machine learning techniques may include, but are not limited to, regression techniques (e.g., ordinary least squares regression (OLSR), linear regression, logistic regression, stepwise regression, multivariate adaptive regression splines (MARS), locally estimated scatterplot smoothing (LOESS)), instance-based techniques (e.g., ridge regression, least absolute shrinkage and selection operator (LASSO), elastic net, least-angle regression (LARS)), decisions tree techniques (e.g., classification and regression tree (CART), iterative dichotomiser 3 (ID3), Chi-squared automatic interaction detection (CHAID), decision stump, conditional decision trees), Bayesian techniques (e.g., naïve Bayes, Gaussian naïve Bayes, multinomial naïve Bayes, average one-dependence estimators (AODE), Bayesian belief network (BNN), Bayesian networks), clustering techniques (e.g., k-means, k-medians, expectation maximization (EM), hierarchical clustering), association rule learning techniques (e.g., perceptron, back-propagation, hopfield network, Radial Basis Function Network (RBFN)), deep learning techniques (e.g., Deep Boltzmann Machine (DBM), Deep Belief Networks (DBN), Convolutional Neural Network (CNN), Stacked Auto-Encoders), Dimensionality Reduction Techniques (e.g., Principal Component Analysis (PCA), Principal Component Regression (PCR), Partial Least Squares Regression (PLSR), Sammon Mapping, Multidimensional Scaling (MDS), Projection Pursuit, Linear Discriminant Analysis (LDA), Mixture Discriminant Analysis (MDA), Quadratic Discriminant Analysis (QDA), Flexible Discriminant Analysis (FDA)), Ensemble Techniques (e.g., Boosting, Bootstrapped Aggregation (Bagging), AdaBoost, Stacked Generalization (blending), Gradient Boosting Machines (GBM), Gradient Boosted Regression Trees (GBRT), Random Forest), SVM (support vector machine), supervised learning, unsupervised learning, semi-supervised learning, etc. Additional examples of architectures include neural networks such as ResNet50, ResNet101, VGG, DenseNet, PointNet, and the like.

The processor(s) 516 of the computing device 504 and the processor(s) 546 of the computing device(s) 540 can be any suitable processor capable of executing instructions to process data and perform operations as described herein. By way of example and not limitation, the processor(s) 516 and the processor(s) 546 can comprise one or more Central Processing Units (CPUs), Graphics Processing Units (GPUs), or any other device or portion of a device that processes electronic data to transform that electronic data into other electronic data that can be stored in registers and/or memory. In some examples, integrated circuits (e.g., ASICs, etc.), gate arrays (e.g., FPGAs, etc.), and other hardware devices can also be considered processors in so far as they are configured to implement encoded instructions.

The memory 518 of the vehicle computing device 504 and the memory 548 of the computing device(s) 540 are examples of non-transitory computer-readable media. The memory 518 and the memory 548 can store an operating system and one or more software applications, instructions, programs, and/or data to implement the methods described herein and the functions attributed to the various systems. In various implementations, the memory 518 and 548 can be implemented using any suitable memory technology, such as static random access memory (SRAM), synchronous dynamic RAM (SDRAM), nonvolatile/Flash-type memory, or any other type of memory capable of storing information. The architectures, systems, and individual elements described herein can include many other logical, programmatic, and physical components, of which those shown in the accompanying figures are merely examples that are related to the discussion herein.

Accordingly, the techniques discussed herein provide a robust implementation of determining a calibration score associated with a sensor to determine a level of accuracy of the sensor to allow the safe operation of an autonomous vehicle.

It should be noted that while FIG. 5 is illustrated as a distributed system, in alternative examples, components of the vehicle 502 may be associated with the computing device(s) 540 and/or components of the computing device(s) 540 may be associated with the vehicle 502. That is, the vehicle 502 may perform one or more of the functions associated with the computing device(s) 540, and vice versa.

Figure 6:
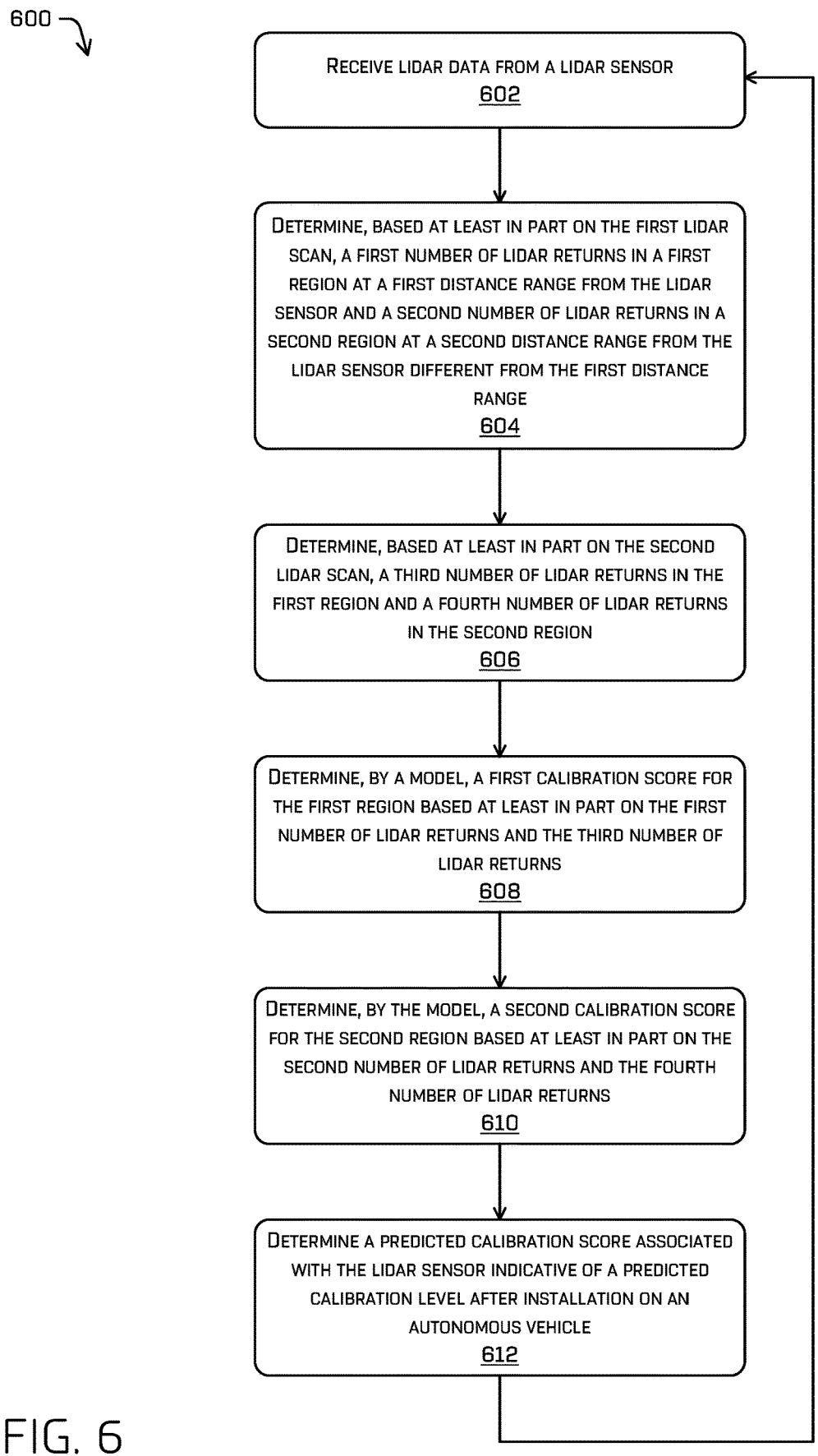
FIG. 6 is an example process for determining a calibration score associated with a sensor based at least in part on sensor data.

FIG. 6 is an example process 600 for determining a calibration score associated with a sensor based at least in part on sensor data. For example, some or all of the process 600 can be performed by one or more components in FIG. 5, as described herein. For example, some or all of the process 600 can be performed by the detector component 104, the detector component 532, and/or the detector component 550.

At operation 602, the process can include receiving lidar data associated with a lidar sensor. In some examples, the operation 602 can include receiving or capturing lidar data from a lidar sensor that comprises a first lidar scan of an environment at a first time and a second lidar scan of the environment at a second time different from the first time. In some examples, the operation 602 can include the sensor 106 receiving or capturing lidar data representing at least a portion of the ground surface 12 in an environment proximate the sensor 106. Of course, in some examples other sensor types such as time of flight sensors, radar sensors, sonar sensors, etc., can capture sensor data.

At operation 604, the process can include determining, based at least in part on the first lidar scan, a first number of lidar returns in a first region at a first distance range from the lidar sensor and a second number of lidar returns in a second region at a second distance range from the lidar sensor different from the first distance range. As discussed herein, the detector component 104 can determine a number of lidar returns in different regions (e.g., the first region 118 and the second region 120) surrounding the sensor 106 at a first time.

At operation 606, the process can include determining, based at least in part on the second lidar scan, a third number of lidar returns in the first region and a fourth number of lidar returns in the second region. As noted herein, the detector component 104 can determine a number of lidar returns in different regions (e.g., the first region 118 and the second region 120) surrounding the sensor 106 at a second time after or before the first time. The first region and the second region can have a similar distance range and can represent regions having various shapes and sizes. By way of example and not limitation, the first region and the second region can be located at different distance from the sensor, can be substantially circular and include a radial distance range of substantially 1 meter.

At operation 608, the process can include determining, by a model, a first calibration score for the first region based at least in part on the first number of lidar returns and the third number of lidar returns. The operation 608 can include the model component 114 determining a calibration score for the first region 118 proximate the sensor 106 based at least in part on an average number of lidar returns in the first region 118 at the first time and the second time, or other data metric.

At operation 610, the process can include determining, by the model, a second calibration score for the second region based at least in part on the second number of lidar returns and the fourth number of lidar returns. For example, the operation 610 can include the model component 114 determining a calibration score for the second region 120 proximate the sensor 106 based at least in part on an average number of lidar returns in the second region 120 at the first time and the second time. Determining the first calibration score and the second calibration score can be based at least in part on the model component 114 implementing a logarithmic algorithm to plot the first number of lidar returns, the second number of lidar returns, the third number of lidar returns, and/or the fourth number of lidar returns relative to respective historical calibration scores received from the vehicle 502.

At operation 612, the process can include determining a predicted calibration score associated with the lidar sensor indicative of a predicted calibration level after installation on an autonomous vehicle. For example, the sensor scoring component 116 can receive outputs from the model component 114 indicative of the calibration scores for the first region and the second regions. For example, the sensor scoring component 116 can determine a confidence interval based at least in part on the first and second calibration scores, and determine the predicted calibration score for the sensor 106 based at least in part on the confidence interval. The confidence interval can, for instance, represent a range of calibration scores, and the predicted calibration score can be based on a minimum calibration score or a maximum calibration score associated with the confidence interval. In one example, the predicted calibration score for the sensor can equate to the minimum calibration score of the confidence interval.

In some examples, the model can include functionality performed by one or more of: the region component 112, the model component 114, and/or the sensor scoring component 116. In some examples, the model can be a machine learned model.

In various examples, the process 600 can continue to operation 602 after determining the final calibration score for the sensor.

Figure 7:
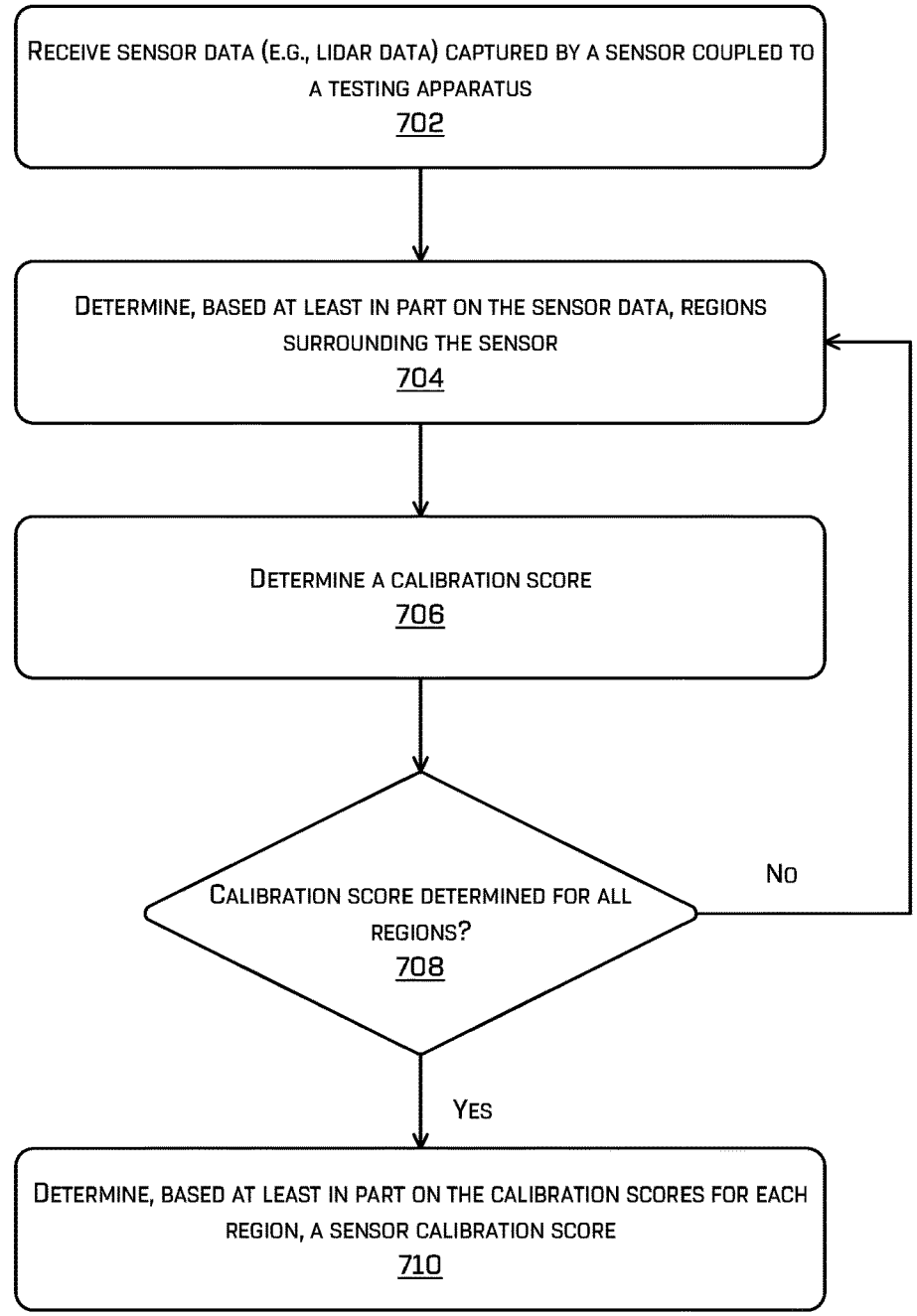
FIG. 7 is another example process for determining a calibration score associated with a sensor based at least in part on sensor data.

FIG. 7 is another example process 700 for determining a calibration score associated with a sensor based at least in part on sensor data. For example, some or all of the process 700 can be performed by one or more components in FIG. 5, as described herein. For example, some or all of the process 700 can be performed by the detector component 104, the detector component 532, and/or the detector component 550.

At operation 702, the process can include receiving sensor data (e.g., lidar data) captured by a sensor coupled to a testing apparatus. In some examples, the operation 702 can include the detector component 104 receiving the sensor data 110 (e.g., lidar data) from the sensor 106 (e.g., a lidar sensor) coupled to the testing apparatus 108. In some examples, the operation 702 can include receiving or capturing image data from one or more image sensors of an autonomous vehicle as the autonomous vehicle traverses an environment. Of course, other sensor types are contemplated herein.

At operation 704, the process can include determining, based at least in part on the sensor data, regions surrounding the sensor. In some examples, the operation 704 can include the region component 112 determining the first region 118 and the second region 120 proximate the sensor 106. The regions can be various shapes, sizes, and/or distances from the sensor 106.

At operation 706, the process can include determining a calibration score for each region. In some examples, the operation 706 can include the model component 114 determining a region calibration score indicating a level of accuracy of the sensor relative to the respective region. To determine the region calibration scores, the model component 114 can implement a mathematical algorithm to generate a curve representing previous region calibration scores.

At operation 708, the process can include determining whether a calibration score has been determined for each region. For example, the model component 114 can determine a region calibration score for the first region 118, the second region 120, and optionally additional region(s).

The operation 708 may be followed by the operation 710 if the calibration scores has been determined for each region (e.g., "yes" in the operation 708). The operation 708 may continue to operation 704 if the calibration scores has not been determined for each region (e.g., "no" in the operation 708).

At operation 710, the process can include determining, based at least in part on the calibration scores for each region, a sensor calibration score. In some examples, the operation 708 can include the sensor scoring component 116 determining the first sensor score 302 and the second sensor score 304 based at least in part on the output(s) from the model component 114. For instance, the sensor scoring component 116 can combine the calibration scores for two or more regions using statistics to output a confidence interval, and the sensor calibration score can be based at least in part on the confidence interval. In such examples, the confidence interval can represent a range of regional calibration scores.

In various examples, the process 700 can continue to operation 702 after determining the sensor calibration score.

FIGS. 6 and 7 illustrate example processes in accordance with examples of the disclosure. These processes are illustrated as logical flow graphs, each operation of which represents a sequence of operations that can be implemented in hardware, software, or a combination thereof. In the context of software, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described operations can be omitted or combined in any order and/or in parallel to implement the processes.

The methods described herein represent sequences of operations that can be implemented in hardware, software, or a combination thereof. In the context of software, the blocks represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described operations can be combined in any order and/or in parallel to implement the processes. In some examples, one or more operations of the method may be omitted entirely. Moreover, the methods described herein can be combined in whole or in part with each other or with other methods.

The various techniques described herein may be implemented in the context of computer-executable instructions or software, such as program modules, that are stored in computer-readable storage and executed by the processor(s) of one or more computing devices such as those illustrated in the figures. Generally, program modules include routines, programs, objects, components, data structures, etc., and define operating logic for performing particular tasks or implement particular abstract data types.

Other architectures may be used to implement the described functionality and are intended to be within the scope of this disclosure. Furthermore, although specific distributions of responsibilities are defined above for purposes of discussion, the various functions and responsibilities might be distributed and divided in different ways, depending on circumstances.

Similarly, software may be stored and distributed in various ways and using different means, and the particular software storage and execution configurations described above may be varied in many different ways. Thus, software implementing the techniques described above may be distributed on various types of computer-readable media, not limited to the forms of memory that are specifically described.

EXAMPLE CLAUSES

Any of the example clauses in this section may be used with any other of the example clauses and/or any of the other examples described herein.

A: A system comprising: one or more processors; and one or more non-transitory computer-readable media storing computer-executable instructions that, when executed, cause the one or more processors to perform operations comprising: receiving lidar data from a lidar sensor, the lidar data comprising a first lidar scan of an environment at a first time and a second lidar scan of the environment at a second time different from the first time: determining, based at least in part on the first lidar scan, a first number of lidar returns in a first region at a first distance range from the lidar sensor and a second number of lidar returns in a second region at a second distance range from the lidar sensor different from the first distance range: determining, based at least in part on the second lidar scan, a third number of lidar returns in the first region and a fourth number of lidar returns in the second region: determining, by a model, a first calibration score for the first region based at least in part on the first number of lidar returns and the third number of lidar returns: determining, by the model, a second calibration score for the second region based at least in part on the second number of lidar returns and the fourth number of lidar returns; and determining a predicted calibration score associated with the lidar sensor indicative of a predicted calibration level after installation on an autonomous vehicle.

B: The system of paragraph A, wherein determining the first calibration score of the first region comprises: determining a first metric based at least in part on the first number of lidar returns and the third number of lidar returns: inputting the first metric into the model: comparing, by the model, the first metric to previous calibration scores associated with the first region; and outputting, by the model, the first calibration score based at least in part on the comparing.

C: The system of either paragraph A or B, wherein: the first calibration score is based at least in part on a first average number of lidar returns based at least in part on the first number of lidar returns and the third number of lidar returns: the second calibration score is based at least in part on a second average number of lidar returns based at least in part on the second number of lidar returns and the fourth number of lidar returns; and the predicted calibration score is based at least in part on the first average number of lidar returns and the second average number of lidar returns.

D: The system of any one of paragraphs A-C, the operations further comprising: determining, based at least in part on the first calibration score for the first region and the second calibration score for the second region, a confidence interval representing a range of calibration scores; and outputting the predicted calibration score of the lidar sensor as a minimum calibration score in the range of calibration scores.

E: The system of any one of paragraphs A-D, wherein: the first region or the second region comprises at least a portion of a ground surface in the environment.

F: A method comprising: receiving sensor data from a sensor, the sensor data comprising first data of an environment at a first time and second data of the environment at a second time different from the first time: determining, based at least in part on the first data, a first number of data points in a region at the first time; determining, based at least in part on the second data, a second number of data points in the region at the second time: determining a data metric associated with the region based at least in part on the first number of data points and the second number of data points: determining a calibration score for the region based at least in part on the data metric; and determining, based at least in part on the calibration score, a predicted calibration score and a confidence level associated with a level of accuracy of the sensor.

G: The method of paragraph F, wherein: the sensor is lidar sensor, the sensor data comprises lidar data, and the first number of data points represent a first number of lidar returns associated with the region.

H: The method of either paragraph F or G, wherein determining the calibration score of the region comprises: inputting the data metric into a model; comparing, by the model, the data metric to previous calibration scores associated with the region; and outputting, by the model, the calibration score of the region based at least in part on the comparing.

I: The method of paragraph H, wherein the model fits a logarithmic function to a point passing through the previous calibration scores and the data metric.

J: The method of any one of paragraphs F-I, further comprising: determining that the predicted calibration score meets or exceeds a threshold; and determining to install the sensor on an autonomous vehicle based at least in part on the predicted calibration score meeting or exceeding the threshold.

K: The method of any one of paragraphs F-J, wherein: the region comprises at least a portion of a ground surface.

L: The method of any one of paragraphs F-K, wherein the sensor is a first sensor, the region is a first region, and the predicted calibration score is a first predicted calibration score, and further comprising: transmitting a model to an autonomous vehicle that is configured to determine a calibration score for a second region proximate the autonomous vehicle and to determine, based at least in part on the calibration score for the second region, a second predicted calibration score associated with a level of accuracy of a second sensor.

M: The method of any one of paragraphs F-L, further comprising: determining an environmental characteristic associated with the environment proximate to the sensor, wherein the environment characteristic comprises one or more of: a color of a ground surface: a reflectivity of the ground surface: a time of day: ambient light data: weather data: or location data: wherein determining the predicted calibration score of the sensor is further based at least in part on the environmental characteristic.

N: The method of any one of paragraphs F-M, wherein the sensor is a first sensor, the sensor data is first sensor data, and determining the calibration score of the region comprises: receiving vehicle data indicating one or more calibration scores determined by a vehicle computing device of a vehicle while the vehicle calibrates a second sensor having a same sensor type as the first sensor: inputting, into a model, the vehicle data and the data metric; and receiving, as an output from the model, the calibration score of the region.

O: The method of any one of paragraphs F-N, wherein the region is a first region, the sensor data is first sensor data, the data metric is a first average number of data points, and determining the calibration score comprises: determining a third number of data points in a second region associated with the first data, the second region having a different distance range than the first region: determining a fourth number of data points in the second region associated with the second data: determining a second average number of data points based at least in part on the third number of data points and the fourth number of data points in the second region; and determining, based at least in part on the first average number of data points and the second average number of data points, the predicted calibration score of the sensor.

P: One or more non-transitory computer-readable media storing instructions executable by a processor, wherein the instructions, when executed, cause the processor to perform operations comprising: receiving sensor data from a sensor, the sensor data comprising first data of an environment at a first time and second data of the environment at a second time different from the first time: determining, based at least in part on the first data, a first number of data points in a region at the first time; determining, based at least in part on the second data, a second number of data points in the region at the second time: determining a data metric associated with the region based at least in part on the first number of data points and the second number of data points: determining a calibration score for the region based at least in part on the data metric; and determining, based at least in part on the calibration score, a predicted calibration score and a confidence level associated with a level of accuracy of the sensor.

Q: The one or more non-transitory computer-readable media of paragraph P, wherein: the sensor is lidar sensor, the sensor data comprises lidar data, the first number of data points represent a first number of lidar returns associated with the region.

R: The one or more non-transitory computer-readable media of either paragraph P or Q, wherein determining the calibration score of the region comprises: inputting the data metric into a model: comparing, by the model, the data metric to previous calibration scores associated with the region; and outputting, by the model, the calibration score of the region based at least in part on the comparing.

S: The one or more non-transitory computer-readable media of paragraph R, wherein the model fits a logarithmic function to a point passing through the previous calibration scores and the data metric.

T: The non-transitory computer-readable media of any one of paragraphs P-S, further comprising: determining that the predicted calibration score meets or exceeds a threshold; and determining to install the sensor on an autonomous vehicle based at least in part on the predicted calibration score meeting or exceeding the threshold.

While the example clauses described above are described with respect to one particular implementation, it should be understood that, in the context of this document, the content of the example clauses can also be implemented via a method, device, system, computer-readable medium, and/or another implementation. Additionally, any of examples A-T may be implemented alone or in combination with any other one or more of the examples A-T.

Conclusion

While one or more examples of the techniques described herein have been described, various alterations, additions, permutations and equivalents thereof are included within the scope of the techniques described herein.

In the description of examples, reference is made to the accompanying drawings that form a part hereof, which show by way of illustration specific examples of the claimed subject matter. It is to be understood that other examples can be used and that changes or alterations, such as structural changes, can be made. Such examples, changes or alterations are not necessarily departures from the scope with respect to the intended claimed subject matter. While the steps herein can be presented in a certain order, in some cases the ordering can be changed so that certain inputs are provided at different times or in a different order without changing the function of the systems and methods described. The disclosed procedures could also be executed in different orders. Additionally, various computations that are herein need not be performed in the order disclosed, and other examples using alternative orderings of the computations could be readily implemented. In addition to being reordered, the computations could also be decomposed into sub-computations with the same results.

What is claimed is:

1. A system comprising:
   one or more processors; and
   one or more non-transitory computer readable media storing computer executable instructions that, when executed, cause the one or more processors to perform operations comprising:
   predicting a calibration level of a lidar sensor prior to installation on an autonomous vehicle by:
   receiving lidar data from the lidar sensor, the lidar data comprising a first lidar scan of an environment at a first time and a second lidar scan of the environment at a second time different from the first time;
   determining, based at least in part on the first lidar scan, a first amount of lidar returns in a first region at a first distance range from the lidar sensor and a second amount of lidar returns in a second region at a second distance range from the lidar sensor different from the first distance range;
   determining, based at least in part on the second lidar scan, a third amount of lidar returns in the first region and a fourth amount of lidar returns in the second region;
   determining, by a model, a first calibration score for the first region based at least in part on the first amount of lidar returns and the third amount of lidar returns;
   determining, by the model, a second calibration score for the second region based at least in part on the second amount of lidar returns and the fourth amount of lidar returns;
   determining, based at least in part on the first calibration score and the second calibration score, the calibration level of the lidar sensor to indicate predicted performance of the lidar sensor after the installation on the autonomous vehicle;
   causing the lidar sensor to be installed on the autonomous vehicle based at least in part on the calibration level, wherein the autonomous vehicle is configured to operate based at least in part on the lidar sensor; and causing the autonomous vehicle to navigate in a real-world environment based on second sensor data output by the lidar sensor.

2. The system of claim 1, wherein determining the first calibration score of the first region comprises:

determining a first metric based at least in part on the first amount of lidar returns and the third amount of lidar returns;

inputting the first metric into the model;

comparing, by the model, the first metric to previous calibration scores associated with the first region; and outputting, by the model, the first calibration score based at least in part on the comparing.

3. The system of claim 1, wherein:

the first calibration score is based at least in part on a first average number of lidar returns based at least in part on the first amount of lidar returns and the third amount of lidar returns;

the second calibration score is based at least in part on a second average number of lidar returns based at least in part on the second amount of lidar returns and the fourth amount of lidar returns; and the calibration level of the lidar sensor is based at least in part on the first average number of lidar returns and the second average number of lidar returns.

4. The system of claim 1, the operations further comprising:

determining, based at least in part on the first calibration score for the first region and the second calibration score for the second region, a confidence interval representing a range of calibration scores; and outputting the calibration level of the lidar sensor as a minimum calibration score in the range of calibration scores.

5. The system of claim 1, wherein:

the first region or the second region comprises at least a portion of a ground surface in the environment.

6. A method comprising:

receiving sensor data from a sensor coupled to a test apparatus, the sensor data comprising first data of an environment at a first time and second data of the environment at a second time different from the first time;

determining, based at least in part on the first data, a first amount of data points in a region at the first time, the region representing a distance range from the sensor;

determining, based at least in part on the second data, a second amount of data points in the region at the second time;

determining a data metric representing an average number of data points associated with the region between the first time and the second time based at least in part on the first amount of data points and the second amount of data points;

determining a calibration score for the region based at least in part on the data metric, the calibration score for the region indicating a level of detection associated with the region over time;

determining, based at least in part on the calibration score for the region, a predicted calibration score of the sensor after being coupled to a robotic device and a confidence level associated with a level of accuracy of the sensor after being coupled to the robotic device; and causing the sensor to be installed on the robotic device based at least in part on the predicted calibration score and the confidence level, wherein the robotic device is configured to operate based at least in part on the sensor; and causing the robotic device to navigate in a real-world environment based on second sensor data output by the sensor.

7. The method of claim 6, wherein:

the sensor is lidar sensor, the sensor data comprises lidar data, and the first amount of data points represents lidar returns associated with the region.

8. The method of claim 6, wherein determining the calibration score of the region comprises:

inputting the data metric into a model;

comparing, by the model, the data metric to previous calibration scores associated with the region; and outputting, by the model, the calibration score of the region based at least in part on the comparing.

9. The method of claim 8, wherein the model fits a logarithmic function to a point passing through the previous calibration scores and the data metric.

10. The method of claim 6, further comprising:

determining that the predicted calibration score meets or exceeds a threshold; and determining to install the sensor on the robotic device based at least in part on the predicted calibration score meeting or exceeding the threshold.

11. The method of claim 6, wherein:

the region comprises at least a portion of a ground surface.

12. The method of claim 6, wherein the sensor is a first sensor, the region is a first region, and the predicted calibration score is a first predicted calibration score, and further comprising:

transmitting a model to the robotic device that is configured to determine a calibration score for a second region proximate the robotic device and to determine, based at least in part on the calibration score for the second region, a second predicted calibration score associated with a level of accuracy of a second sensor.

13. The method of claim 6, further comprising:

determining an environment characteristic associated with the environment proximate to the sensor, wherein the environment characteristic comprises one or more of:

a color of a ground surface;

a reflectivity of the ground surface;

a time of day;

ambient light data;

weather data; or location data;

wherein determining the predicted calibration score of the sensor is further based at least in part on the environment characteristic.

14. The method of claim 6, wherein the sensor is a first sensor, the sensor data is first sensor data, and determining the calibration score of the region comprises:

receiving vehicle data indicating one or more calibration scores determined by a vehicle computing device of a vehicle while the vehicle calibrates a second sensor having a same sensor type as the first sensor;

inputting, into a model, the vehicle data and the data metric; and receiving, as an output from the model, the calibration score of the region.

15. The method of claim 6, wherein the region is a first region, the sensor data is first sensor data, the average number of data points is a first average number of data points, and determining the calibration score comprises:
- determining a third amount of data points in a second region associated with the first data, the second region having a different distance range than the first region;
- determining a fourth amount of data points in the second region associated with the second data;
- determining a second average number of data points based at least in part on the third amount of data points and the fourth amount of data points in the second region; and
- determining, based at least in part on the first average number of data points and the second average number of data points, the predicted calibration score of the sensor.

16. One or more non transitory computer readable media storing instructions executable by a processor, wherein the instructions, when executed, cause the processor to perform operations comprising:
- receiving sensor data from a sensor in a first environment, the sensor data comprising first data of an environment at a first time and second data of the environment at a second time different from the first time;
- determining, based at least in part on the first data, a first amount of data points in a region at the first time, the region representing a distance range from the sensor;
- determining, based at least in part on the second data, a second amount of data points in the region at the second time;
- determining a data metric representing an average number of data points associated with the region between the first time and the second time based at least in part on the first amount of data points and the second amount of data points;
- determining a calibration score for the region based at least in part on the data metric, the calibration score for the region indicating a level of detection associated with the region over time;
- determining, based at least in part on the calibration score for the region, a predicted calibration score of the sensor in a second environment and a confidence level associated with a level of accuracy of the sensor in the second environment;
- causing the sensor to be installed on a robotic device based at least in part on the predicted calibration score and the confidence level, wherein the robotic device is configured to operate based at least in part on the sensor; and
- causing the robotic device to navigate in a real-world environment based on second sensor data output by the sensor.

17. The one or more non transitory computer readable media of claim 16, wherein:
- the sensor is lidar sensor,
- the sensor data comprises lidar data, and
- the first amount of data points represents lidar returns associated with the region.

18. The one or more non transitory computer readable media of claim 16, wherein determining the calibration score of the region comprises:
- inputting the data metric into a model;
- comparing, by the model, the data metric to previous calibration scores associated with the region; and
- outputting, by the model, the calibration score of the region based at least in part on the comparing.

19. The one or more non transitory computer readable media of claim 16, the operations further comprising:
- determining that the predicted calibration score meets or exceeds a threshold; and
- determining to install the sensor on the robotic device based at least in part on the predicted calibration score meeting or exceeding the threshold.

20. The one or more non transitory computer readable media of claim 16, wherein:
- the first environment is a test environment that does not include the robotic device, and
- the second environment includes the robotic device for coupling to the sensor.

* * * * *